United States Patent [19]

Woody

[11] Patent Number: 5,065,976
[45] Date of Patent: Nov. 19, 1991

[54] SUPPORT STRUCTURE

[75] Inventor: George Woody, Redondo Beach, Calif.

[73] Assignee: Hughes Aircraft Company, Los Angeles, Calif.

[21] Appl. No.: 429,897

[22] Filed: Oct. 31, 1989

[51] Int. Cl.[5] ............................................. F16M 13/00
[52] U.S. Cl. .................................. 248/549; 244/118.5; 248/900
[58] Field of Search ........................ 248/548, 549, 900; 403/DIG. 3; 244/118.5, 181

[56] References Cited

U.S. PATENT DOCUMENTS

| 3,654,806 | 4/1972 | Bateman ........................ 244/181 X |
| 3,686,626 | 8/1972 | Bateman et al. ................. 244/181 X |
| 3,895,769 | 7/1975 | Hagaman ....................... 248/909 X |
| 3,967,799 | 7/1976 | Muller ................................. 244/181 |
| 4,301,989 | 11/1981 | Kallenbach ......................... 248/548 |
| 4,961,548 | 10/1990 | Adams et al. .................... 244/118.5 |

FOREIGN PATENT DOCUMENTS

| 1240031 | 7/1960 | France ................................. 248/900 |
| 1224875 | 3/1971 | United Kingdom ................ 248/549 |

Primary Examiner—David L. Talbott
Attorney, Agent, or Firm—Leonard A. Alkov; Wanda K. Denson-Low

[57] ABSTRACT

Combiner (12) is supported in position on the pilot's line-of-sight on hinge (24) and by means of a strut (26). When the combiner is impacted, the strut collapses as a bending column to permit the combiner to fold down before breaking.

15 Claims, 3 Drawing Sheets

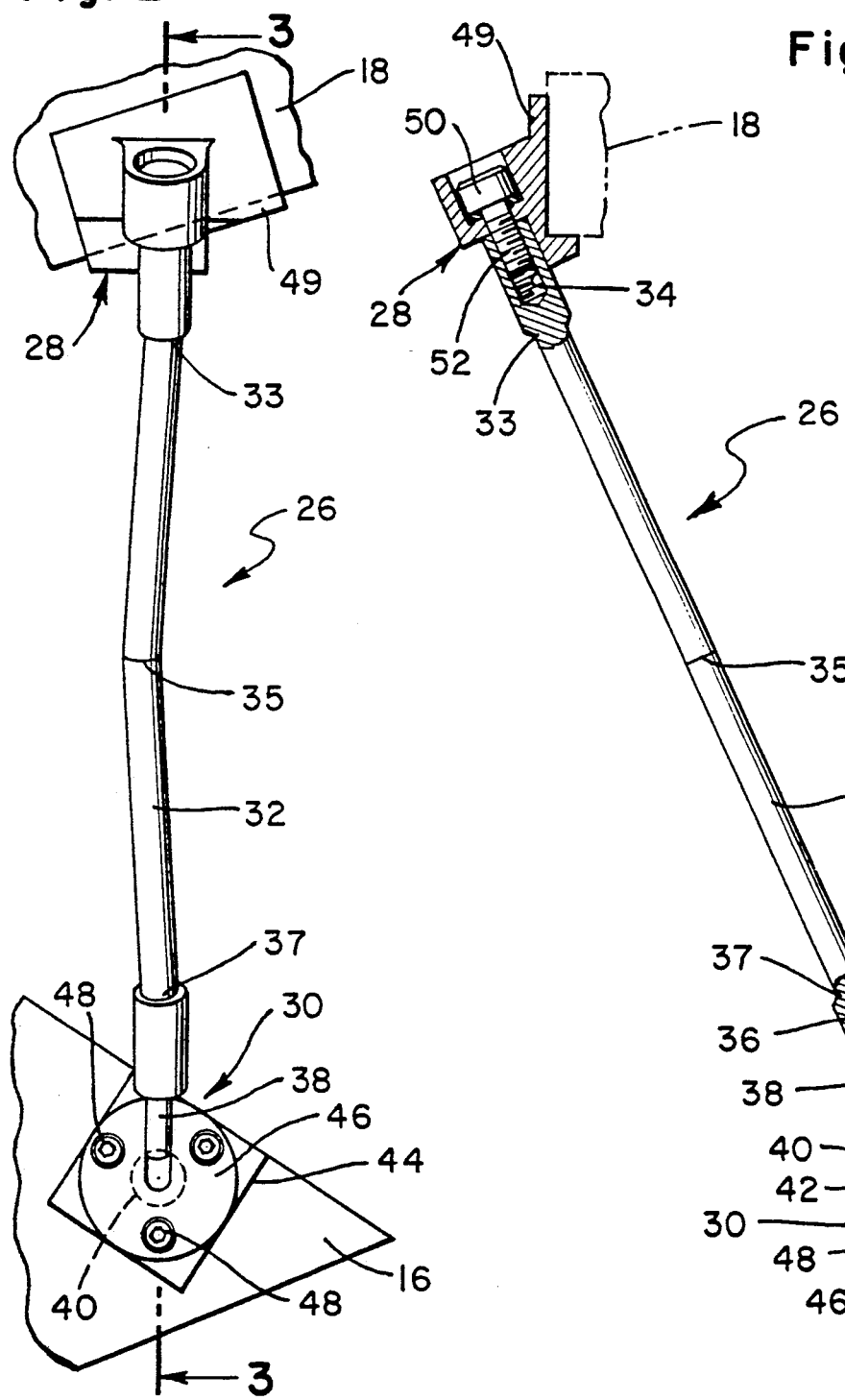

SUPPORT STRUCTURE

FIELD OF THE INVENTION

This invention is directed to a support which firmly retains a member in position until a force approaching that which would break the member is applied to the member. Thereupon, the member folds out of the way. In the preferred embodiment, the member is a headup display combiner behind the windscreen of an aircraft.

BACKGROUND OF THE INVENTION

Modern aircraft are provided with a windscreen which is quite strong and flexible. When the aircraft strikes a bird, with the bird impinging upon the windscreen, hopefully, the windscreen maintains integrity, even though flexing, to protect the pilot. However, sometimes the windscreen is broken and the pilot is subjected to harm from parts of the windscreen and from the onrushing air. In some aircraft, a headup display combiner is positioned on the pilot's line-of-sight. If the combiner remains in place, it provides some protection for the pilot. However, should windscreen structure or other masses such as the bird also impact the combiner, it is desirable for the combiner to move out of the way rather than shatter. The shattering of such a glass optical element would further risk the pilot. Thus, it is desirable to provide a combiner support structure which firmly holds the combiner in place until the combiner receives forces approaching those which would break up the combiner.

SUMMARY OF THE INVENTION

In order to aid in the understanding of this invention, it can be stated in essentially summary form that it is directed to a support structure for a member wherein the support structure includes a hinge supporting the member and a column attached to the member to inhibit its rotation. The column is configured to fail when columnar loading approaches member destruction loading.

It is thus a purpose and advantage of this invention to provide a support structure which firmly supports a member in position, but permits the member to move away from its position when member loading approaches member destruction loading.

It is another purpose and advantage of this invention to provide a support structure for a combiner which is positioned inside the windscreen of a vehicle to support the combiner in the user's line-of-sight until combiner destructive forces are approached.

It is a further purpose and advantage of this invention to provide a support structure which employs a strut or column which firmly supports the member in position, but with the column configured to bend and permit the member to swing out of the way when impact on the member might cause damage and/or breakup of the member so that moving the member out of the way when large forces are applied thereto both prevents damage to the member and prevents the distribution of parts of the member resulting from shattering thereof.

Other purposes and advantages of this invention will become apparent from a study of the following portion of this specification, the claims and the attached drawings wherein:

BRIEF DESCRIPTION OF THE DRAWINGS

FIG. 2 is an enlarged side view of the support column, together with its top and bottom securement pads, and with parts of the structure to which the securement pads are attached broken away.

FIG. 3 is a generally longitudinal section through the support column and securement pads, as seen generally along line 3—3 of FIG. 2.

DESCRIPTION OF THE PREFERRED EMBODIMENT

Figure 1:
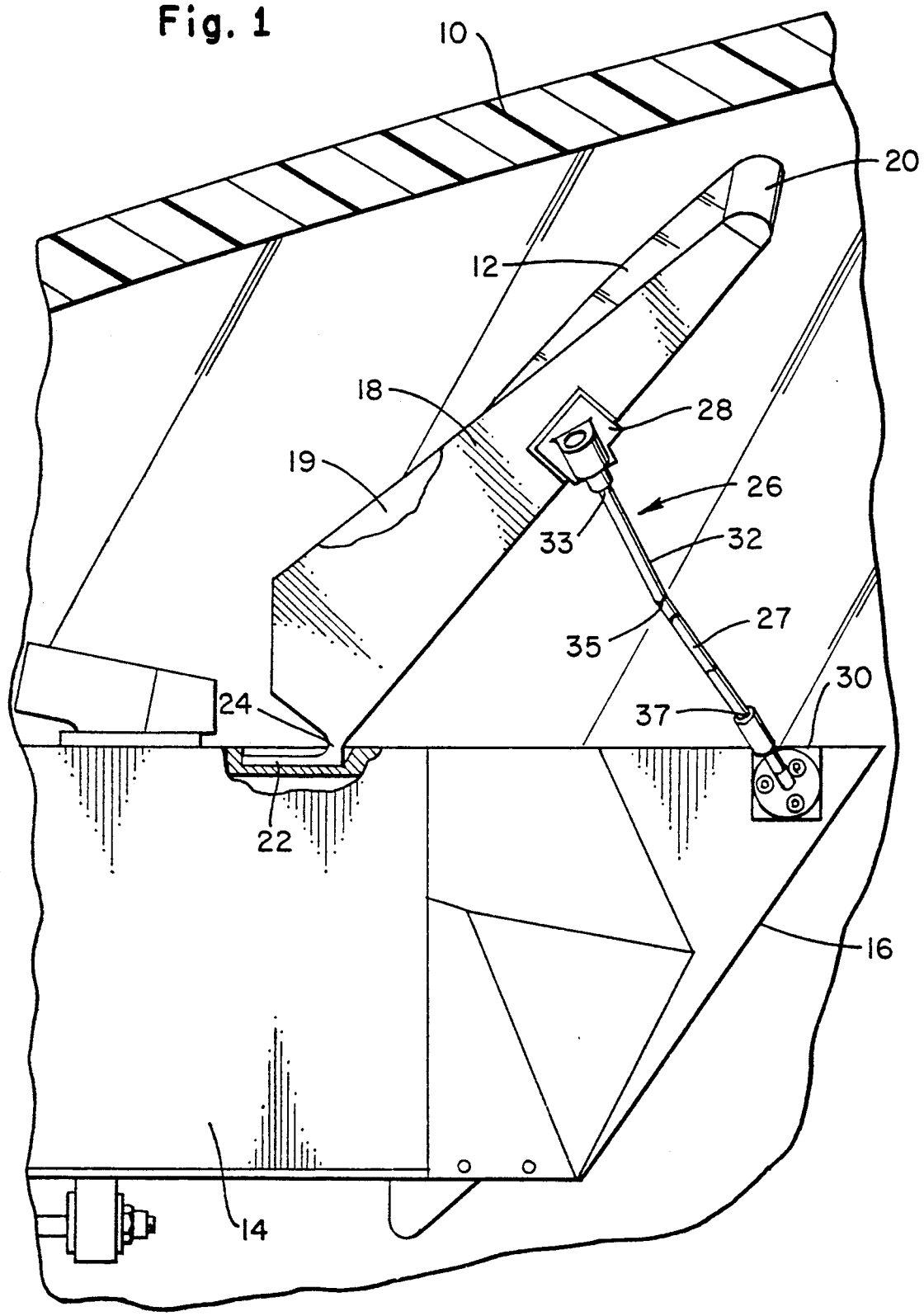
FIG. 1 is a side-elevational view of the support structure, showing the near support strut almost obscuring the identical far support strut, in the preferred utilization in an aircraft cockpit, shown partly broken away.
Figure 4:
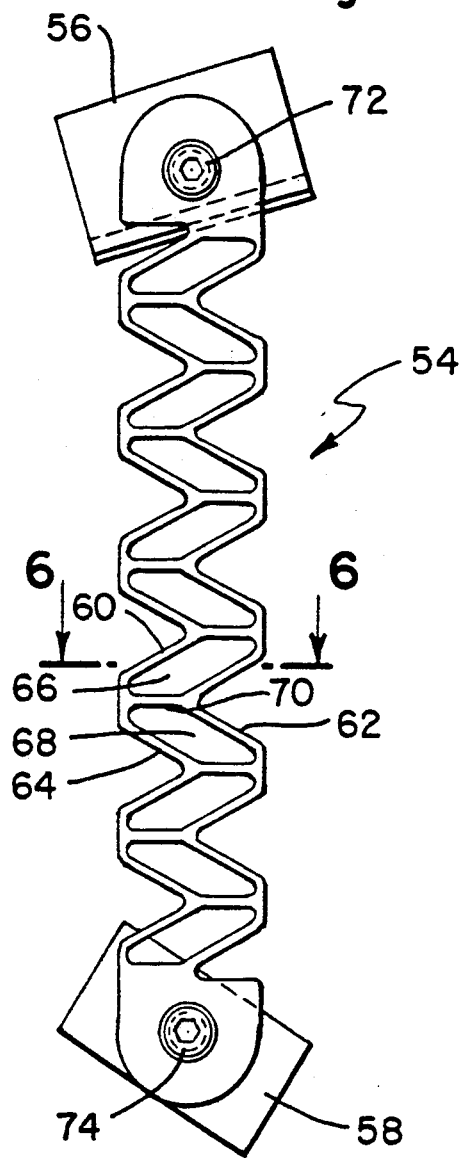
FIG. 4 is a side-elevational view of another support column, as seen generally the same way as FIG. 2, showing a second preferred embodiment of the support column wherein the breakdown force is more linear.
Figure 5:
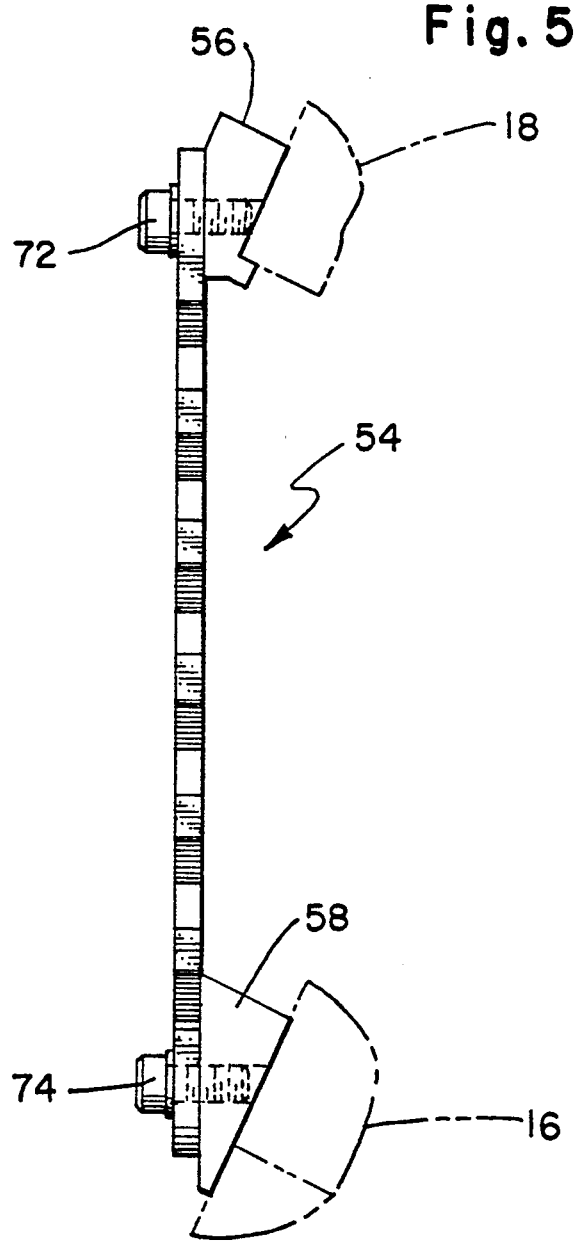
FIG. 5 is a view similar to FIG. 3 of the second preferred embodiment of the support column.
Figure 6:
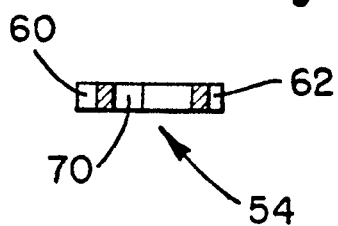
FIG. 6 is a section taken generally along line 6—6 of FIG. 4.

In one preferred utilization, the support structure of this invention is used in the cockpit of an aircraft. In FIG. 1, the pilot's canopy or windscreen in the aircraft is indicated at 10. The pilot sits to the right, and the line-of-sight from the pilot is left-to-right above the center of the figure. Combiner 12 is on his line-of-sight and is a hologram of a mirror so that the pilot has a direct view therethrough of the actual scene in front of him. Data source 14 provides information to the pilot in addition to the real-time scene. The data is visual and relates to the operation of the aircraft. Should the aircraft be military, the data may include military information. Should the vehicle be an automobile, the combiner is the windscreen itself and is on the line-of-sight of the driver, and the data would include parameters relating to the operation of the automobile. The data is generated in the data source and is reflected upward by a mirror within mirror housing 16. The hologram of a mirror inside the combiner 12 shows this data on and near the line-of-sight so that the combined data image and real scene are observed by the pilot. The combiner is, thus, a large optical element which is situated between the pilot's vision and the outside world. Superimposed on this combiner is the pilot's avionic monitoring instrumentation and real-world environment. This simultaneous combined viewing of the real world and the data source generated symbology lends the appropriate name of "combiner" to the optical element.

There is always danger that the windscreen 10 will be damaged, which includes being broken away. When the flight path of a bird crosses the flight path of the aircraft on a collision course, a bird strike occurs. This impact could hit the canopy resulting in possible damage to the canopy, damage to the combiner, and possible injury to the pilot. In order to protect the pilot from harm from parts of the windscreen, the bird and the air blast, it is desirable that the combiner 12 stay in its upright position, if possible. In accordance with this invention, the combiner 12 is supported in a way so as to protect the pilot against injury from the bird, the broken windscreen, and the air stream to near the strength of the combiner and to allow the combiner to collapse under impact to reduce the risk of pilot injury from broken combiner glass. The structure of this invention rigidly holds the combiner in place under normal accelerational forces and normal vibrational environments to maintain the optical performance, yet the combiner support structure will yield and permit the combiner to move away prior to combiner destruction.

As seen in FIG. 1, combiner 12 is mounted at its edges on left and right side brackets. The left side bracket is indicated at 18 in FIGS. 1, 2 and 3. The right side bracket 19 is identical, is secured to the far side of the combiner 12, and in FIG. 1, is almost hidden by side bar 18. The side bracket 18 is partly broken away in FIG. 1 to show a small portion of side bracket 19. The side brackets are adhesively secured to the left and right edges of the combiner, and cross bar 20 joins the side brackets at the top. At their lower ends, the side brackets terminate in feet, with foot 22 being shown in FIG. 1. The foot 22 is joined to the principal portion of the left side bracket by means of reduced section 24, which can act as a hinge. The foot 22 is secured into an appropriate pocket in the top of the housing of data source 14. Adhesive or threaded fastener attachment is suitable.

In order to provide additional support strength to the combiner, left and right struts are provided. The left and right struts are symmetrically identical, and the left strut is generally indicated at 26 in FIGS. 1, 2 and 3. The right strut 27 is partly seen in FIG. 1 through a small breakaway in strut 26. The left strut 26 and comprises an upper attachment structure 28, a lower attachment structure 30, and the strut 32. As seen in its first preferred embodiment in FIGS. 2 and 3, the strut 32 is a solid metal rod of any convenient cross section, such as square, or is in the form of a right cylinder, as shown. Each strut has three bends therein. The bends are very specifically defined, as is described later, but in the preferred embodiment shown, the bends are such that one surface of the rod which forms the support strut 32 lies substantially on the axis centrally through the ends of the rod. Thus, the rod is bent off axis approximately one radius of the rod.

The strut 32 is conveniently attached by threaded fastenings. At its upper and lower ends, it respectively carries threaded sockets 34 and 36. Ball shank 38 has threads thereon which are received in the lower socket 36. The ball shank 38 has a substantially spherical ball 40 secured thereto on a neck extending from the threaded portion of the ball shank. The ball 40 is received in a socket 42 formed within a base 44 and cover 46. The cover is attached by means of three screws, one of which is indicated at 48, which extend through the cover into mirror housing 16 so as to form a firm support for the lower end of the strut. This ball and socket mounting aids in accurate mounting of the combiner for interchangeability. A slot is provided in cover 46 to permit the assembly and to permit the ball shank 38 to extend upward at a close angle with respect to the side of mirror housing 16. When in place, the ball is firmly clamped.

Upper attachment structure 28 comprises a mount 49 which is configured to be permanently secured to the left side bracket 18, as by welding or adhesive means. Machine screw 50 has its head engaged in a recess in mount 49. The threaded portion 52 of the machine screw engages in the threaded interior of socket 34. The struts rigidly support the combiner on the data source 14 and mirror housing 16. When material forcefully engages the front of the combiner, the left side in FIG. 1, the reduced section 24 acts as a hinge to provide a flexing fulcrum. The strut 32 bends under the force of the impact. The force at which bending failure occurs is determined using the principles of Euler's buckling column. The formula according to Euler for this case is $$P_{cr} = \frac{4\pi^2 EI}{l^2}$$

where $P_{cr}$ is the critical load at buckling.
E is the modulus of elasticity for the specific material used. As is seen from this formula, as the length (l) decreases, $P_{cr}$ decreases. As the moment of inertia (I) increases, which is defined by $$I = \frac{1}{12} a^4$$

where a is the side dimension of a square, $P_{cr}$ increases. This criteria along with a windblast analysis and vibrational analysis was used to optimize the strut cross sectional area. Both ends of the strut are clamped to maximize strut length before buckling failure.

The strut has three bends 33, 35 and 37 in it to control the direction of the bend. A single bend is sufficient, but there is an increased risk in putting a critical bending moment in the mounting screw of the strut mount at the combiner side bracket. In order to provide as narrow a strut as possible to avoid obscuration of pilot vision, the strut is preferably made of high-tensile, high-yield strength material such as 17-4PH CRES. However, aluminum may also be used.

In the breakdown of a strut such as strut 32, the stress versus strain rises linearly to the breakdown point and then rapidly, the stress goes to a much lower value. In some cases, it may be desirable to permit a small breakdown, but thereafter maintain the combiner mirror in a partially raised position. For this reason, the strut 54 serves as a second preferred embodiment. An upper attachment structure 56 and lower attachment structure 58 are provided to respectively attach the strut 54 to the side brackets of the combiner and the upper corners of the mirror housing 16 of the data source. The attachment structures 56 and 58 are configured to the angles of the parts. Strut 54 is a bar of rectangular cross section from which material has been removed to define a plurality of pairs of bending beams.

The notches are formed alternately in each edge of the rectangular bar of strut 54, and corresponding parallelogrammic openings therein define a plurality of parallelogrammic structures which serve as bending beams. For example, notches 60, 62 and 64, together with parallelogrammic openings 66 and 68 define a pair of parallelograms with a common cross bar 70. The parallelogrammic arms extend at the same angle away from the common cross bar so that, when axial compressive stress is applied to the strut 54 along the axis between its fastening bolts 72 and 74, the parallelogrammic arms bend with respect to the common cross bar. As stress is applied, one set of angularly oriented parallelogrammic arms bends, but when that small section is collapsed, the original stress-versus-strain characteristics remain. Thus, the amount of stress applied to the strut 54 necessary to cause it to collapse is substantially constant throughout the entire collapse. Each small section of the strut individually fails as each parallelogram individually collapses in the direction along the axis. In this way, should the applied stress substantially reduce as the combiner 12 is partway down, the strut 54 will maintain the combiner in place to serve as partial protection for the pilot.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A support structure comprising:
    a base;
    a side bracket, a member supported on said side bracket;
    hinge means interconnecting said side bracket and said base;
    a rigid strut connected to said side bracket and to said base to rigidly support said side bracket and said member supported thereby, said rigid strut being configured to collapse by columnar failure when a force approaching member breaking force is applied to said member so that said member and said side bracket swing down around said hinge means.

2. The support structure of claim 1 wherein said side bracket has a foot thereon for attachment to said base and said hinge means is a thin section between said side bracket and said foot.

3. The support structure of claim 2 wherein said strut is a columnar strut and fails in columnar failure.

4. The support structure of claim 1 wherein said columnar strut has a bend therein to accurately define the force at which columnar failure occurs.

5. A support structure for a combiner mirror in a vehicle;
    a combiner;
    said support structure comprising first and second side brackets mounted on said combiner;
    hinge means on said side brackets;
    a base, said hinge means being secured to said base;
    first and second rigid struts respectively connected to said first and second side brackets and secured to said base, said first and second rigid struts being configured so that when a force below combiner destructive force is applied to said combiner, said rigid struts collapse by columnar collapse to permit said side brackets to hinge down at their hinge means to lower said combiner away from the application of force to prevent destruction of said combiner.

6. The support structure of claim 5 wherein said hinge means is an integral thin section of said side brackets so that said side brackets hinge by bending at said thin sections.

7. The support structure of claim 5 wherein each of said rigid struts is a substantially cylindrical rod having attachment means at each end so that the attachment means at one end comprise side bracket attachment means and the attachment means at the other end comprise base attachment means.

8. The support structure of claim 7 wherein said struts are bent to precisely define the point of columnar collapse.

9. The support structure of claim 8 wherein at least one of said attachment means is a ball-and-socket attachment means.

10. The support structure of claim 9 wherein said base is a data source for providing visible information to the surface of said combiner.

11. A support structure comprising:
    a base, hinge mounting means and strut attachment means on said base;
    a side bracket, said side bracket having an upper end and a lower end, said lower end of said side bracket having hinge means thereon attached to said hinge mounting means on said base, said side bracket having attachment means thereon;
    a rigid strut connected between said attachment means on said side bracket and said attachment means on said support for supporting said side bracket, said rigid strut being configured to collapse by irreversible columnar collapse when excessive force is applied to said side bracket.

12. The support structure of claim 11 wherein said rigid strut is an elongated member attached to said attachment structure at its end, said elongated member having a bend therein to precisely define the force at which said strut collapses.

13. The support structure of claim 12 wherein aid elongated member is a rod and at least one of said attachment means is a ball-and-socket joint.

14. The support structure of claim 13 wherein the other of said attachment structures is a rigid attachment structure.

15. The support structure of claim 14 wherein said bend in said rod is substantially equal to one radius of said rod.

* * * * *